(12) United States Patent
Geffin et al.

(10) Patent No.: US 11,934,889 B2
(45) Date of Patent: Mar. 19, 2024

(54) RISK-BASED SCHEDULING OF CONTAINERIZED APPLICATION SERVICES

(71) Applicant: Vertiv Corporation, Columbus, OH (US)

(72) Inventors: Steven Geffin, Bay Harbor Islands, FL (US); James Shelton, Maryville, TN (US)

(73) Assignee: Vertiv Corporation, Westerville, OH (US)

( * ) Notice: Subject to any disclaimer, the term of this patent is extended or adjusted under 35 U.S.C. 154(b) by 761 days.

(21) Appl. No.: 16/929,575

(22) Filed: Jul. 15, 2020

(65) Prior Publication Data

US 2021/0019196 A1 Jan. 21, 2021

Related U.S. Application Data

(60) Provisional application No. 62/874,272, filed on Jul. 15, 2019.

(51) Int. Cl.
*G06F 9/50* (2006.01)

(52) U.S. Cl.
CPC .......... *G06F 9/5088* (2013.01); *G06F 9/5016* (2013.01); *G06F 9/505* (2013.01); *G06F 9/5077* (2013.01); *G06F 9/5094* (2013.01)

(58) Field of Classification Search
CPC ...... G06F 9/5088; G06F 9/5016; G06F 9/505; G06F 9/5077; G06F 9/5094; G06F 9/5027

See application file for complete search history.

(56) References Cited

U.S. PATENT DOCUMENTS

| | | | |
|---|---|---|---|
| 9,690,622 B1* | 6/2017 | Argenti | G06F 9/5027 |
| 2017/0242469 A1* | 8/2017 | Harris | H02J 1/102 |
| 2017/0264493 A1* | 9/2017 | Cencini | H04L 67/1008 |
| 2018/0203736 A1* | 7/2018 | Vyas | G06F 9/5077 |
| 2019/0097900 A1* | 3/2019 | Rodriguez | G06F 11/1484 |
| 2022/0188965 A1* | 6/2022 | Li | G06T 1/20 |
| 2022/0321644 A1* | 10/2022 | Nagata | G06F 9/5027 |

OTHER PUBLICATIONS

International Search Report and Written Opinion dated Oct. 14, 2020 for PCT/US2020/042090.

* cited by examiner

*Primary Examiner* — Eyob Hagos
(74) *Attorney, Agent, or Firm* — Suiter Swantz pc llo

(57) ABSTRACT

The present disclosure is a system for risk-based scheduling of a containerized application service. The system may include a scheduler extender which is configured to receive a list of nodes available to process an application or part of an application to be completed by one or more nodes of the list of nodes and receive information from one or more information technology (IT) sensors configured to measure an aspect of an IT operation associated with nodes of the list of nodes. The scheduler extender may be configured to filter the list of nodes based on the information from the one or more information technology (IT) sensors which measure an aspect of an IT operation associated with nodes of the list of nodes.

13 Claims, 6 Drawing Sheets

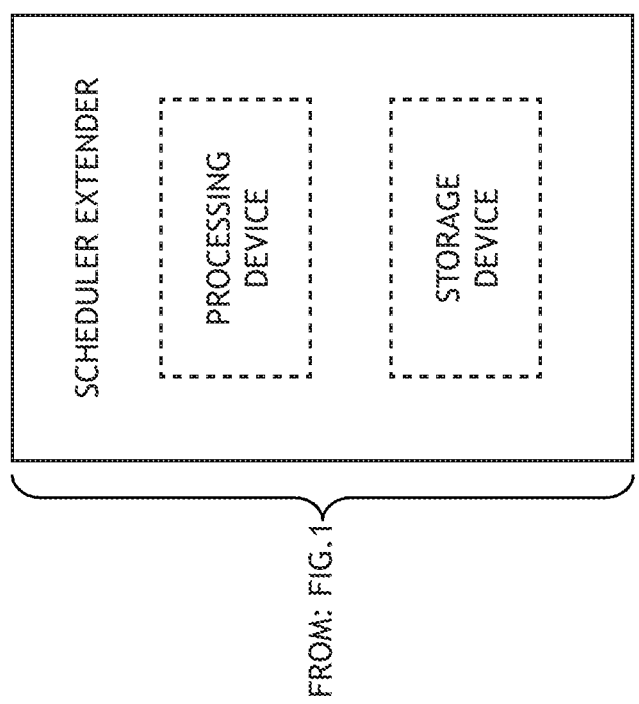
FIG. 1 Contd.

RISK-BASED SCHEDULING OF CONTAINERIZED APPLICATION SERVICES

CROSS REFERENCE TO RELATED APPLICATIONS

The present application claims the benefit under 35 U.S.C. § 119 of U.S. Provisional Patent Application Ser. No. 62/874,272 filed Jul. 15, 2019. The U.S. Provisional Patent Application Ser. No. 62/874,272 filed Jul. 15, 2019 is hereby incorporated by reference in its entirety.

TECHNICAL FIELD

The present disclosure generally relates to the field of scheduling application services, and more particularly to a risk-based scheduling application service.

BACKGROUND

Kubernetes is an open-source system for automating deployment, scaling, and management of containerized applications. Programs running on Kubernetes are packaged as Containers, which are self-contained execution environments. Any program and all of its dependencies can be packaged up into a single file and then shared. Containers are becoming the preferred choice for deploying and managing software applications. Kubernetes wraps one or more Containers into a higher-level structure (e.g., a Pod) that is housed on nodes. A node is the smallest unit of computing hardware and represents a single machine, which may be a physical machine (e.g., a server) or a Virtual Machine (VM). A Kubernetes Cluster is a pool of nodes that may include a master Kubernetes node configured to manage a plurality of Kubernetes worker nodes. When a Pod (e.g., program/application) is deployed onto a Kubernetes Cluster, the Cluster intelligently handles distributing the Pod. Clusters are made of different numbers of nodes (e.g., physical servers) that are housed in racks in a data center. These physical servers may be housed in a single rack or distributed across several racks. These racks can be powered by the same power source or different power sources. In a redundant setup, the rack will be powered by two different power sources. In the same vein, the racks can be cooled by the same computer room air conditioning (CRAC) unit or computer room air handler (CRAH).

At the present time, Kubernetes deploys Pods (e.g., applications) to nodes based solely on computer processing unit (CPU) resources and memory (e.g., random access memory (RAM)) resources. Thus, Kubernetes does not effectively mitigate the risk of Information Technology (IT) operational concerns. As such, it would be advantageous to provide a system to remedy the shortcomings of the conventional approaches identified above.

SUMMARY

Accordingly, the present disclosure is directed to a system for risk-based scheduling of a containerized application service. The system may include a scheduler extender which is configured to receive a list of nodes available to process an application or part of an application to be completed by one or more nodes of the list of nodes and receive information from one or more information technology (IT) sensors configured to measure an aspect of an IT operation associated with nodes of the list of nodes. The scheduler extender may be configured to filter the list of nodes based on the information from the one or more information technology (IT) sensors which measure an aspect of an IT operation associated with nodes of the list of nodes.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Figure 1:
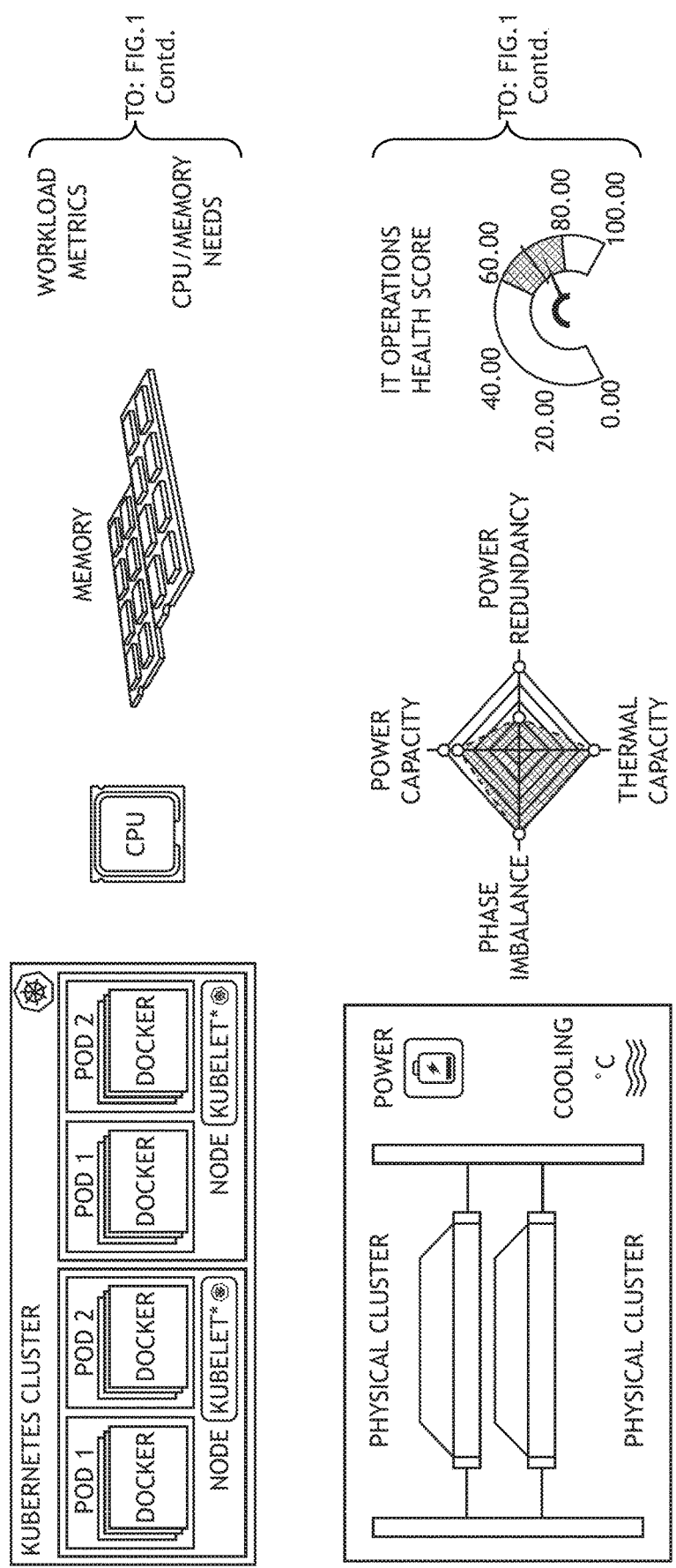
FIG. 1 depicts an exemplary system including a scheduler extender for risk-based scheduling of a containerized application service in accordance with an embodiment of the present disclosure.

Reference will now be made in detail to the subject matter disclosed, which is illustrated in the accompanying drawings.

Before any embodiments of the disclosure are explained in detail, it is to be understood that the embodiments may not be limited in application per the details of the structure or the function as set forth in the following descriptions or illustrated in the figures. Different embodiments may be capable of being practiced or carried out in various ways. Also, it is to be understood that the phraseology and terminology used herein is for description and should not be regarded as limiting. The use of terms such as "including," "comprising," or "having" and variations thereof herein are generally meant to encompass the item listed thereafter and equivalents thereof as well as additional items. Further, unless otherwise noted, technical terms may be used according to conventional usage. It is further contemplated that like reference numbers may describe similar components and the equivalents thereof.

The present disclosure is directed to a system for risk-based scheduling of a containerized application service. The system may include a scheduler extender which is configured to receive a list of nodes available to process an application or part of an application to be completed by one or more nodes of the list of nodes and receive information from one or more information technology (IT) sensors configured to measure an aspect of an IT operation associated with nodes of the list of nodes. The scheduler extender may be configured to filter the list of nodes based on the information from the one or more information technology (IT) sensors which measure an aspect of an IT operation associated with nodes of the list of nodes.

It is contemplated that the containerized application service may include a Kubernetes system, VMware system, and the like, but the description provides an exemplary system operational for a Kubernetes system.

Current scheduling systems define the physical nodes with very limited or no knowledge of underlying IT physical infrastructure resources supporting the applications. Systems such as VMware and Kubernetes define the nodes based on processing capacity, memory capacity, and affinity rules. However, these systems do not take into consideration the status, health, or operational status of the physical infrastructure where the nodes are located.

Containers are becoming the new standard for deploying and managing software. Container Orchestration software/platforms, such as Kubernetes, automate application deployment, scaling, and management of the operations of application containers across a cluster of hosts (e.g., servers). Kubernetes takes into consideration the individual and collective resource requirements, quality of service requirements, hardware/software/policy constraints, affinity and anti-affinity specifications, data locality, inter-workload inference, deadlines, and so on. However, the individual and collective resource requirements used in Kubernetes are only based on processing capacity and memory capacity, such as computer processing unit (CPU) resources and memory (e.g., RAM) resources. Kubernetes does not take into consideration the available power, power redundancy, or the thermal condition of the server or the air surrounding the server rack(s) when making a scheduling decision. Thus, Kubernetes lacks awareness of the state of the critical information technology infrastructure and physical locations. The physical locations may include, but are not limited to, where servers are physically installed, in which rack, and where the rack is physically located in the data center; what the power source(s) is that is servicing the rack via the rack PDU (rPDU), what power outlet on the rPDU the server is plugged into; what cooling equipment is cooling and extracting heat and which sensors are measuring the temperature of each server or rack; and which racks and servers would be affected by failure of a downstream uninterruptable power supply (UPS) or computer room air conditioning (CRAC) unit or by taking that equipment out of service for maintenance or repairs.

The state of critical infrastructure and physical locations is important to enhance decision-making about scheduling, in order to reduce the risk of programs and applications going down or having to be re-located because of looming or potential critical infrastructure issues. Critical infrastructure failures can happen at any time due to equipment failure or human error, and Kubernetes does not effectively or efficiently reduce the risk of such failures occurring. As such, it would be advantageous to provide a system to remedy the shortcomings of the conventional approaches identified above.

Referring to FIG. 1, an exemplary system including a scheduler extender for risk-based scheduling of a containerized application service in accordance with an embodiment of the present disclosure is shown. A system of the present disclosure may include a virtual cluster of a containerized application service (e.g., Kubernetes cluster). The virtual cluster may include a plurality of nodes, whereby the plurality of nodes includes a plurality of pods. The plurality of pods may be configured to support or complete a function.

Each node of the plurality of nodes is assigned to the virtual cluster. When an application, or portion of an application (e.g., a Pod) needs to be deployed, the application is put in a scheduling queue. The application, or part of an application, may be deployed to a node of the plurality of nodes after the virtual cluster makes a determination on which node the application should be located based on logical data from one or more workload metrics. The one or more workload metrics may be based on processing capacity and memory capacity, such as a central processing unit (CPU), a memory (e.g., RAM), or the like. The scheduler extender may include a processing device and storage device configured to execute a computer-readable instructions stored on the storage device, which, when executed by the processing device, cause the processing device to perform operations to filter nodes for execution of an application, or portion of an application (e.g. a pod) based on information from one or more information technology (IT) sensors which measure an aspect of an IT operation associated with the nodes.

The system may also include a physical infrastructure (e.g., physical cluster). The physical infrastructure may include one or more computers or servers, communicatively coupled to each other such that each computer or server of the one or more computers/servers may work together. The physical infrastructure may further include one or more server racks. The one or more server racks may include one or more servers.

The system may further include one or more pieces of upstream equipment. The one or more pieces of upstream equipment may include any hardware related to the physical infrastructure, including, but not limited to, one or more power distribution units (PDUs) configured to provide power to the physical infrastructure, one or more computer room air conditioning (CRAC) units, one or more fans, or the like.

The physical infrastructure may also include one or more IT sensors configured to measure one or more aspects of Information Technology (IT) operation, such as IT operational metrics. It is contemplated that the one or more IT sensors may be hardware-based sensors affixed to the physical infrastructure. Further, it is contemplated that the one or more IT sensors may be integrated on-board sensors or meters configured to communicate with a data center infrastructure management (DCIM) system. The one or more IT sensors may be associated with each node, or server, of the system.

The one or more IT sensors may be configured to generate data based on IT operational metrics, such as at least one of power capacity, phase imbalance, power redundancy, thermal capacity, or the like. The one or more IT sensors may include any sensor known in the art suitable for generating at least one of power capacity, phase imbalance, power redundancy, thermal capacity, or the like. For example, the one or more IT sensors may include one or more thermal sensors to generate temperature data of the physical infrastructure. By way of another example, the one or more IT sensors may include a current measuring device. By way of a further example, the one or more IT sensors may include a phase detection device. By way of another example, the one or more IT sensors may include a power measuring device. By way of a further example, the one or more IT sensors may include one or more pressure sensors. By way of an additional example, the one or more IT sensors may include an air flow meter.

Figure 3:
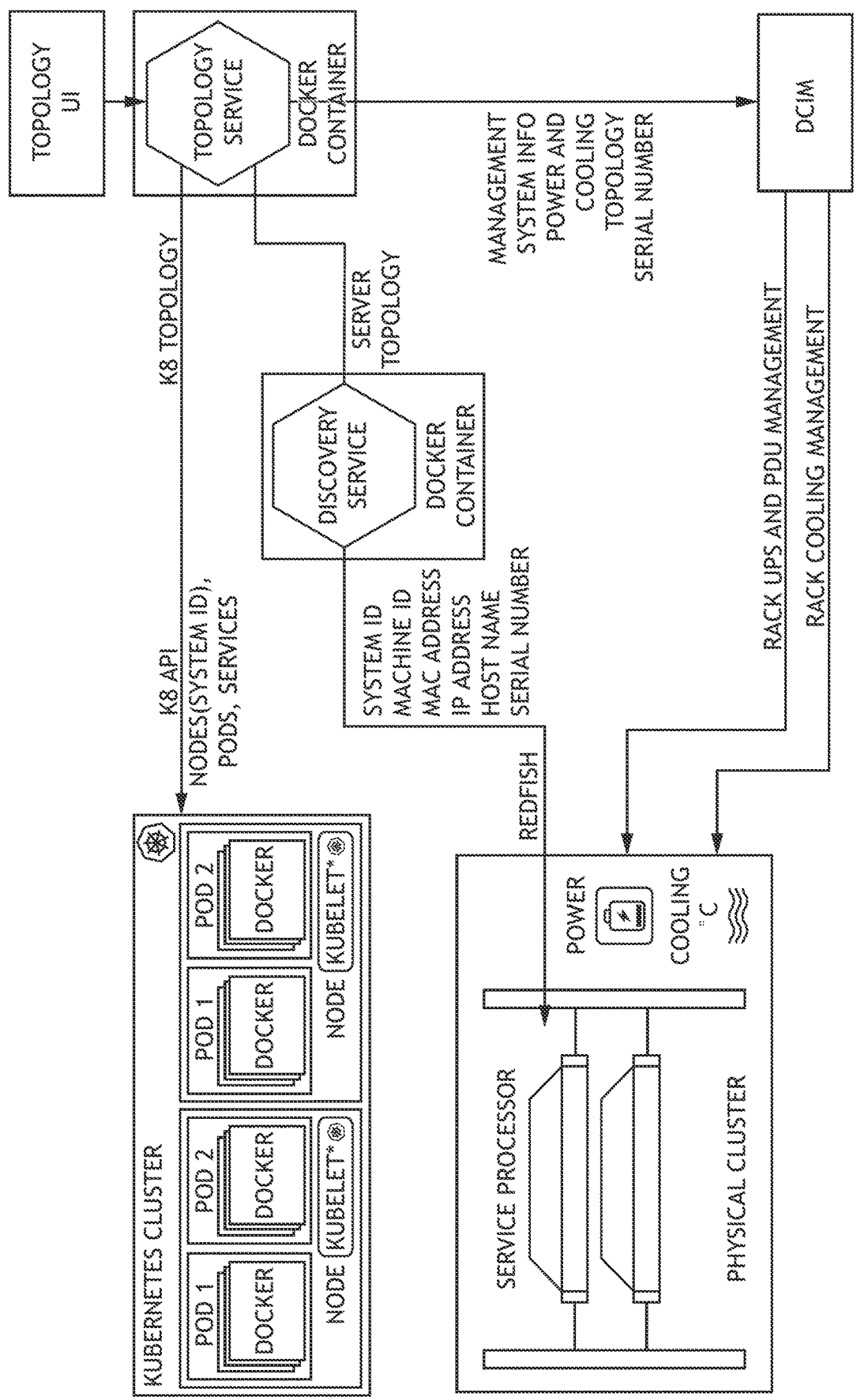
FIG. 3 depicts an exemplary system for risk-based scheduling of a containerized application service including a topology service and discovery service in accordance with an embodiment of the present disclosure.

The system may further include a data center infrastructure management (DCIM) system. A DCIM system may collate, store, and analyze data related to power and cooling of a data center in real-time. DCIM software, such as an application programming interface (API) may aggregate and analyze data from IT sensors, and further may provide display of current status information and may provide alerts. The DCIM software may be executed by a computing device and may be a networked computing device which may allow transfer of the data to a cloud-based server device. One example of a DCIM system and API is the Trellis™ Platform commercially available from the assignee of the present disclosure which is configured to receive the data from the one or more IT sensors or directly from the power and cooling equipment (e.g., the one or more pieces of upstream equipment) as shown in FIG. 3. The DCIM system may be configured to store the data in a memory on the DCIM system. The DCIM system may further be configured to communicate such data, measured by the one or more IT sensors, to one or more components of the system (e.g., scheduler extender, such as a scheduler extension in a Kubernetes cluster). The DCIM system may further be configured to transform the data (e.g., the data from the one or more IT sensors) into a format suitable for the scheduler extender.

Figure 2:
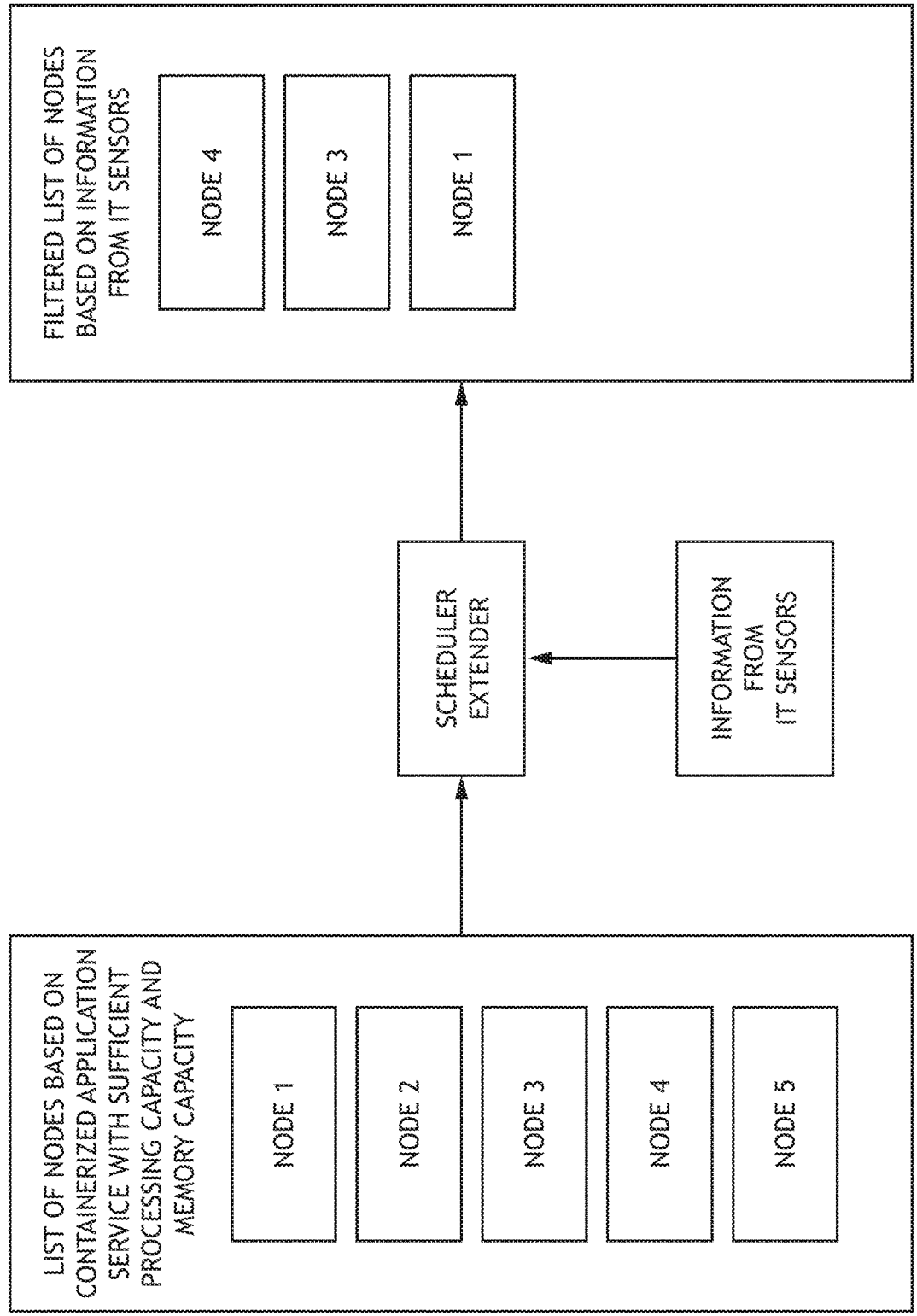
FIG. 2 depicts exemplary filtering of a list of nodes by a scheduler extender based on information from IT sensors in accordance with an embodiment of the present disclosure.

Referring to FIG. 2, exemplary filtering of a list of nodes by a scheduler extender based on information from IT sensors in accordance with an embodiment of the present disclosure is shown. It is contemplated that a list of nodes may be initially presented by the containerized application service (Kubernetes or VMware) whereby the list of nodes includes nodes that have sufficient processing capacity and sufficient memory capacity. The scheduler extender may be configured to filter the list of nodes identified in the scheduling queue (by the virtual cluster) based on the data from the one or more IT sensors. The scheduler extender may be configured to remove one or more nodes from the list of nodes based on the data from the one or more IT sensors (e.g. Node 2 and Node 5 were removed as shown in exemplary fashion in FIG. 2). Alternatively, the scheduler extender may be configured to prioritize the list of nodes identified in the scheduling queue based on maintenance information of the one or more pieces of upstream equipment. For example, the scheduler extender may be configured to take a particular unit offline and off service based on the maintenance information of the one or more pieces of upstream equipment.

The system may be configured to generate an Information Technology (IT) operations health score based on the data from the one or more IT sensors coupled to, or associated with, the one or more components of the physical infrastructure. The system may further be configured to generate the IT operations health score based on the data directly from the DCIM system. The IT operations health score may be based on at least one of power capacity, phase imbalance, power redundancy, thermal capacity, or the like. The IT operations health score may be further based on one or more space management components including, but not limited to, asset management, stranded capacity, scenario planning, or the like. The IT operations health score may be generated using any algorithm suitable for analyzing at least one of power capacity, phase imbalance, power redundancy, thermal capacity, space management, or the like.

The scheduler extender may be configured to use the IT operations health score generated based on the data from the one or more IT sensors to filter the list of nodes (e.g., remove a node from the list of nodes from the scheduling queue). For example, at least one node of the list of nodes may be removed (e.g., filtered) from the queue due to a server of the physical infrastructure being too hot. By way of another example, at least one node of the plurality of nodes may be removed from the queue due to a server of the physical infrastructure not having sufficient power capacity. By way of a further example, at least one node of the plurality of nodes may be removed from the queue due to a server of the physical infrastructure not having sufficient power and cooling capacity. By way of an additional example, at least one node of the plurality of nodes may be removed from the queue in order to prevent phase imbalance in a server of the physical infrastructure. By way of a further example, at least one node of the plurality of nodes may be removed from a queue due to a lack of adequate power redundancy.

The scheduler extender may further be configured to prioritize the plurality of nodes based on the IT operations health score. For example, as shown in FIG. 2, the scheduler extender may be configured to prioritize the plurality of nodes such that the best fit node is higher in the scheduling queue than a least fit node in the scheduling queue. For instance, the system may deploy an application to a best fit node higher in the queue (e.g. Node 4 as shown in exemplary fashion in FIG. 2) before deploying an application to a least fit node in the queue (e.g. Node 1 as shown in an exemplary fashion in FIG. 2). It is contemplated that best fit node may have the highest IT operations health score where the least fit node may have the lowest IT operations health score.

Referring to FIG. 3, an exemplary system for risk-based scheduling of a containerized application service including a topology service and discovery service in accordance with an embodiment of the present disclosure is shown. The system for risk-based scheduling of a containerized application service may include a discovery service configured to identify the plurality of nodes (e.g., the physical servers). For example, the discovery service may discover the plurality of nodes (e.g., the physical servers) by sending a signal to each node of the plurality of nodes. The discovery service may further be configured to extract specific data from each node of the plurality of nodes (e.g., the physical servers) that uniquely identifies each node (e.g., each physical server), such as a system ID, machine ID, MAC addresses, IP addresses, host name, and/or serial number.

The system for risk-based scheduling of a containerized application service may further include a topology service configured to discover at least one of the plurality of nodes, associated Pods, and associated Containers running on the virtual cluster. For example, the topology service may discover the at least one of the plurality of nodes, associated Pods, or associated Containers using an algorithm that automatically maps the logical representation of the individual node (e.g., associated Pods and Containers) to an individual physical server, as well as the location and position of the server within a server rack, and even further, all the associated power feeds (e.g., UPS, PDU, or the like) and cooling systems. For example, the system may identify that node 2 is located on server 4, which is located in rack 2. Such a topology service allows the system to efficiently and accurately remove and/or prioritize nodes such that the system can deploy the applications (e.g., Pods) to the correct node.

The system for risk-based scheduling of a containerized application service may further include a topology user interface (UI) configured to allow a user to edit (e.g., change, delete, update, or the like) the topology service data. For example, a user may edit the topology service data to remove a server that is undergoing a repair or that is out-of-order. By way of another example, a user may edit the connectivity of the equipment (e.g., what server is mapped to what node).

The system for risk-based scheduling of a containerized application service may further be configured to deploy an application to each node of the plurality of nodes based on the one or more workload metrics (from the virtual cluster) and the IT operations health score and/or data from the one or more IT sensors. The one or more IT sensors may be associated with a DCIM system. DCIM software may aggregate and analyze data from IT sensors, and further may provide display of current status information and may provide alerts. The DCIM software may be executed by a computing device and may be a networked computing device which may allow transfer of the data to a cloud-based server device. One example of a DCIM system and API is the Trellis™ Platform commercially available from the assignee of the present disclosure which is configured to receive the data from the one or more IT sensors or directly from the power and cooling equipment (e.g., the one or more pieces of upstream equipment)

The system risk-based scheduling of a containerized application service may be configured to manage the deployment of an application to a server of the physical infrastructure based on the IT operations health score. For example, the system may be configured to deploy an application to the server of the physical infrastructure when the IT operations health score indicates that the server has sufficient power capacity or thermal capacity, decreased likelihood of phase imbalance, and sufficient power redundancy, or the like. By way of another example, the system may be configured to stop deployment of an application to the server of the physical infrastructure when the IT operations health score indicates that the server has substantially insufficient power capacity or insufficient thermal capacity, increased likelihood of phase imbalance and insufficient power redundancy, or the like.

Figure 4:
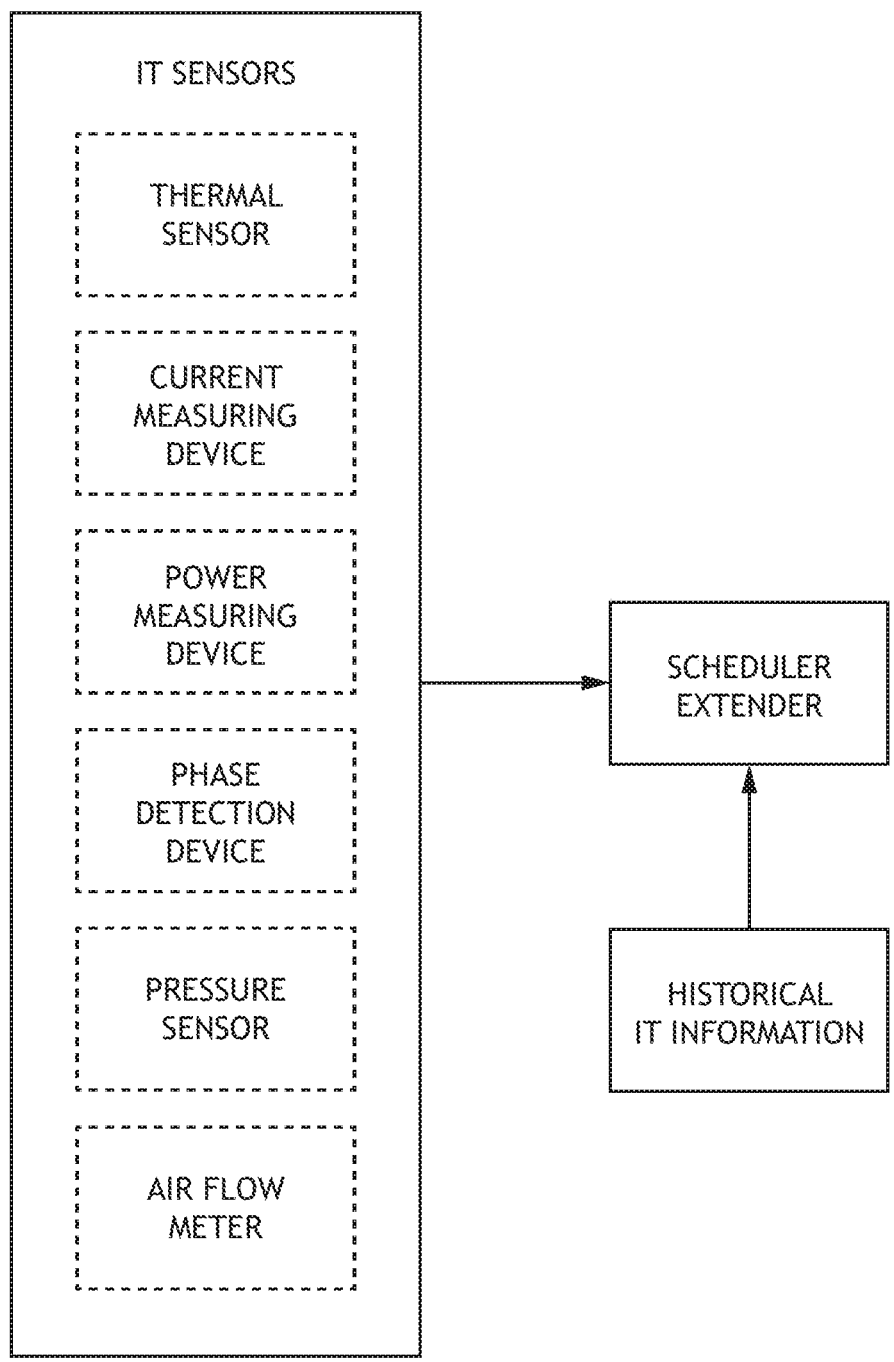
FIG. 4 depicts an exemplary diagram which includes a scheduler extender receiving data from IT sensors and historical IT information in accordance with an embodiment of the present disclosure.

Referring to FIG. 4, an exemplary diagram which includes a scheduler extender receiving data from IT sensors and historical IT information in accordance with an embodiment of the present disclosure is shown. IT sensors may include a thermal sensor, a current measuring device, a power measuring device, a phase detection device, a pressure sensor, or an air flow meter. Further, it is contemplated that IT sensors may include a humidity sensor, a dew point sensor, a vibration sensor, a smoke detector, or a contact sensor. The contact sensor may provide an alert if a facility has been improperly breached. The system may be configured to store historical IT information on a memory device or storage device. The scheduler extender of the system may be configured to receive the historical IT information and utilize such information in the IT operations health score in combination with the data received from one or more IT sensors. The historical IT information may include, but is not limited to, time of day, future predictions, or the like.

It is contemplated that the system may have numerous advantages. For example, the system may reduce risks by deciding which node a given application should be deployed to (e.g., a node with sufficient power and thermal capacity and that matches redundancy policies for the application). For instance, the system may reduce risks by deploying an application to a node after the IT operations health score is generated and such score indicates that the physical infrastructure has sufficient capacity to handle the application. By way of another example, the system may reduce the risk of IT equipment outages which are running business applications. For instance, by deploying applications to nodes after gathering an IT operations health score, the risk of physical infrastructure failure decreases.

Further, it is contemplated that the IT operations health score is indicative of the overall health and capacities of IT systems (e.g., physical infrastructure) supporting the servers by taking into account at least one of power capacity, phase imbalance, power redundancy, thermal capacity, or the like. Each server may have a unique IT operations health score based on the at least one of power capacity, phase imbalance, power redundancy, thermal capacity, or the like for that specific server. The system will not deploy an application to a node (e.g., server) with an IT operations health score that reflects low power capacity or low thermal capacity. Further, the system will not deploy an application to a node (e.g., server) with an IT operations health score that indicates a likelihood of phase imbalance or lack of power redundancy.

Figure 5:
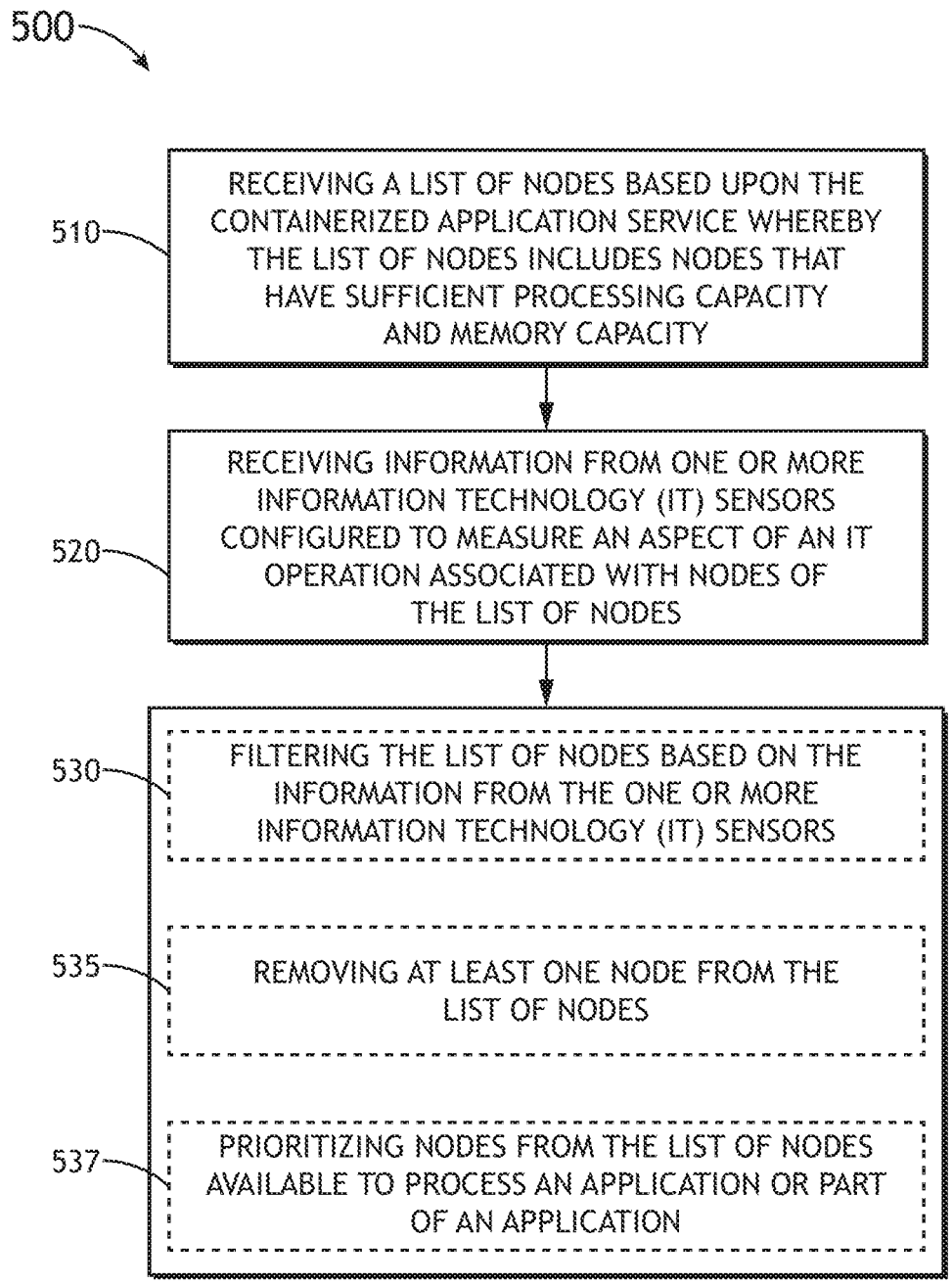
FIG. 5 depicts an exemplary flow diagram of a method for risk-based scheduling of a containerized application service in accordance with an embodiment of the present disclosure.

Referring to FIG. 5, an exemplary flow diagram of a method 500 for risk-based scheduling of a containerized application service in accordance with an embodiment of the present disclosure is shown. Method 500 may be executed by the system for risk-based scheduling of a containerized application service as shown in FIG. 1 and FIG. 3. Method 500 for risk-based scheduling of a containerized application service may include receiving a list of nodes based upon the containerized application service whereby the list of nodes includes nodes that have sufficient processing capacity and memory capacity 510. Each node of the list of nodes may refer to a physical server in a particular rack. Method 500 may further include receiving information from one or more information technology (IT) sensors configured to measure an aspect of an IT operation associated with nodes of the list of nodes 520. Method 500 may further include filtering the list of nodes based on the information from the one or more information technology (IT) sensors 530.

It is contemplated that filtering the list of nodes based on the information from the one or more information technology (IT) sensors 530 may include removing at least one node from the list of nodes 535. Additionally, it is contemplated that filtering the list of nodes based on the information from the one or more information technology (IT) sensors 530 may include prioritizing nodes from the list of nodes available to process an application or part of an application 537.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be implemented (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be implemented, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those having skill in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims.

The invention claimed is:

1. A system for risk-based scheduling of a containerized application service, comprising:
  a scheduler extender, the scheduler extender including a processing device and non-transitory computer-readable instructions stored on a storage device, which, when executed by the processing device, cause the processing device to perform operations comprising:

receiving a list of nodes available to process an application or part of an application to be completed by one or more nodes of the list of nodes;

receiving information from one or more information technology (IT) sensors configured to measure an aspect of an IT operation associated with nodes of the list of nodes; the one or more IT sensors including a thermal sensor, a current measuring device, a power measuring device, and a phase detection device; and filtering the list of nodes based on the information from the one or more information technology sensors configured to measure an aspect of an IT operation associated with nodes of the list of nodes, wherein each node associated with the list of nodes refers to a physical server located in a particular rack, wherein filtering the list of nodes based on the information from the one or more information technology sensors configured to measure an aspect of the IT operation associated with nodes of the list of nodes includes: prioritizing nodes from the list of nodes available to process an application or part of an application based upon the IT operations health score associated with each node calculated from data from the one or more IT sensors, wherein the IT operations health score is an indication of the ability of each node to process the application or part of the application; and removing at least one node from the list of nodes available to process an application or part of an application based on the information from the one or more IT sensors, wherein the removing at least one node from the list of nodes available to process an application or part of an application based on the information from the one or more IT sensors is based on the IT operations health score associated with each node calculated from data from the one or more IT sensors, wherein the IT operations health score is lower when its associated node has insufficient power capacity or phase imbalance.

2. The system as claimed in claim 1, wherein each node associated with the list of nodes refers to a physical server located in a particular rack.

3. The system as claimed in claim 1, wherein the application or part of an application is a pod.

4. The system as claimed in claim 1, wherein the receiving a list of nodes available to process an application or part of an application to be completed by one or more nodes of the list of nodes is based upon the containerized application service whereby the list of nodes includes nodes that have sufficient processing capacity and memory capacity.

5. The system as claimed in claim 1, wherein the one or more IT sensors includes a vibration sensor, a humidity sensor, a pressure sensor, or an air flow meter.

6. The system as claimed in claim 1, wherein the one or more information technology (IT) sensors configured to measure an aspect of an IT operation associated with nodes of the list of nodes are associated with a data center infrastructure management (DCIM) system.

7. The system as claimed in claim 6, wherein receiving information from the one or more information technology (IT) sensors configured to measure an aspect of an IT operation associated with nodes of the list of nodes includes receiving the information from the DCIM system.

8. The system as claimed in claim 1, wherein the IT operations health score is higher when its associated node has sufficient power capacity or phase balance.

9. The system as claimed in claim 1, wherein the filtering the list of nodes is further based on historical data.

10. A system for risk-based scheduling of a containerized application service, comprising: a scheduler extender, the scheduler extender including a processing device and non-transitory computer-readable instructions stored on a storage device, which, when executed by the processing device, cause the processing device to perform operations comprising:

receiving a list of nodes available to process an application or part of an application to be completed by one or more nodes of the list of nodes, the list of nodes is based upon the containerized application service whereby the list of nodes includes nodes that have sufficient processing capacity and memory capacity;

receiving information from one or more information technology (IT) sensors configured to measure an aspect of an IT operation associated with nodes of the list of nodes, the one or more IT sensors including a thermal sensor, a current measuring device, a power measuring device, and a phase detection device; and filtering the list of nodes based on the information from the one or more information technology sensors configured to measure an aspect of an IT operation associated with nodes of the list of nodes, wherein each node associated with the list of nodes refers to a physical server located in a particular rack, wherein filtering the list of nodes based on the information from the one or more information technology sensors configured to measure an aspect of an IT operation associated with nodes of the list of nodes includes: prioritizing nodes from the list of nodes available to process an application or part of an application based upon an IT operations health score associated with each node calculated from data from the one or more IT sensors, wherein the IT operations health score is an indication of the ability of each node to process the application or part of the application; and removing at least one node from the list of nodes available to process an application or part of an application based on the information from the one or more IT sensors, wherein the removing at least one node from the list of nodes available to process an application or part of an application based on the information from the one or more IT sensors is based on the IT operations health score associated with each node calculated from data from the one or more IT sensors, wherein the IT operations health score is lower when its associated node has insufficient power capacity or phase imbalance.

11. The system as claimed in claim 10, wherein the IT operations health score is higher when its associated node has sufficient power capacity or phase balance.

12. A computer-implemented method for risk-based scheduling of a containerized application service, executable by a processing device and non-transitory computer-readable instructions stored on a storage device, which, when executed by the processing device, cause the processing device to perform operations comprising:

receiving a list of nodes available to process an application or part of an application to be completed by one or more nodes of the list of nodes, the list of nodes is based upon the containerized application service whereby the list of nodes includes nodes that have sufficient processing capacity and memory capacity;

receiving information from one or more information technology (IT) sensors configured to measure an aspect of an IT operation associated with nodes of the list of nodes, the one or more IT sensors including a thermal sensor, a current measuring device, a power measuring device, and a phase detection device; and filtering the list of nodes based on the information from the one or more information technology sensors configured to measure an aspect of an IT operation associated with nodes of the list of nodes, wherein each node associated with the list of nodes refers to a physical server located in a particular rack, wherein filtering the list of nodes based on the information from the one or more information technology sensors configured to measure an aspect of an IT operation associated with nodes of the list of nodes includes: prioritizing nodes from the list of nodes available to process an application or part of an application based upon an IT operations health score associated with each node calculated from data from the one or more IT sensors, wherein the IT operations health score is an indication of the ability of each node to process the application or part of the application; and removing at least one node from the list of nodes available to process an application or part of an application based on the information from the one or more IT sensors, wherein the removing at least one node from the list of nodes available to process an application or part of an application based on the information from the one or more IT sensors is based on the IT operations health score associated with each node calculated from data from the one or more IT sensors, wherein the IT operations health score is lower when its associated node has insufficient power capacity or phase imbalance.

13. The computer-implemented method as claimed in claim 12, wherein the IT operations health score is higher when its associated node has sufficient power capacity or phase balance.

* * * * *